United States Patent [19]

Bachman

[11] E Patent Number: Re. 31,851

[45] Reissued Date of Patent: Mar. 19, 1985

[54] SIGNAL PROCESSING SYSTEM

[75] Inventor: Wesley J. Bachman, Auburn, Ill.

[73] Assignee: Dickey-john Corporation, Auburn, Ill.

[21] Appl. No.: 583,352

[22] Filed: Feb. 24, 1984

Related U.S. Patent Documents

Reissue of:

[64] Patent No.: 4,359,734
Issued: Nov. 16, 1982
Appl. No.: 8,057
Filed: Jan. 31, 1979

U.S. Applications:

[63] Continuation of Ser. No. 821,651, Aug. 4, 1977, abandoned.

[51] Int. Cl.[3] ..... G01S 7/34; G01S 13/58

[52] U.S. Cl. ..... 343/8; 343/7 AG

[58] Field of Search ..... 343/7 PL, 7 VM, 7 AG, 343/8

[56] References Cited

U.S. PATENT DOCUMENTS

| | | | |
|---|---|---|---|
| 3,465,336 | 9/1969 | Fishbein et al. | 343/7 AG |
| 3,599,110 | 8/1971 | Gindi | 331/17 |
| 3,715,751 | 2/1973 | Mead | 343/7 A |
| 3,885,238 | 5/1975 | Klein et al. | 343/7 A |
| 3,895,384 | 7/1975 | Fathauer et al. | 343/9 |
| 4,016,568 | 4/1977 | Makimoto et al. | 343/8 |
| 4,020,490 | 4/1977 | Millard | 343/7 PL |
| 4,052,722 | 10/1977 | Millard | 343/8 |
| 4,072,947 | 2/1978 | Johnson | 343/7 PL |

*Primary Examiner*—Theodore M. Blum

*Attorney, Agent, or Firm*—Trexler, Bushnell & Wolters, Ltd.

[57] ABSTRACT

An improved system for processing an electrical velocity information signal in a velocity detecting system in which a detector is utilized for developing an electrical information signal, such as a Doppler signal, having a characteristic (e.g. frequency) that varies systematically with the object's velocity. A converter develops an oscillatory signal having a frequency which varies in accordance with the velocity information signal characteristic. A tracking filter having a center frequency that varies with the oscillatory signal filters all frequencies other than the center frequency. A signal generator is responsive to the frequency of the signal passed by the tracking filter for generating an output signal having a frequency which is a preset ratio relative to the center frequency, whereby the output signal of the system is relatively noise-free and has a frequency which represents the velocity of the object being detected. Another feature of the disclosed embodiment of the invention utilizes a switching network comprising a pair of flip-flops and a pair of shift registers which are responsive to the oscillatory signal passed by the tracking filter and to an oscillatory signal generated by a voltage-controlled oscillator for alternately charging and discharging a storage capacitor which is coupled to the inverting input of an operational amplifier used as a comparator. A variable resistance is placed in either the charging or discharging path and the output of the op amp is used as an error voltage to control the frequency of the VCO to thus provide a frequency locked loop.

28 Claims, 2 Drawing Figures

SIGNAL PROCESSING SYSTEM

Matter enclosed in heavy brackets [ ] appears in the original patent but forms no part of this reissue specification; matter printed in italics indicates the additions made by reissue.

This is a continuation of application Ser. No. 821,651, Filed: Aug. 4, 1977, now abandoned.

BACKGROUND OF THE INVENTION

This invention generally relates to signal processing systems and, more particularly, to improving the accuracy and reliability of such a system which uses a velocity detector in the form of a microwave transceiver and which takes advantage of the Doppler effect to obtain an electrical velocity information signal.

The application of microwave transceivers which use the Doppler effect to determine velocity are well known. Such applications include, for example, vehicular speed detection employed by police officers to enforce highway speed limits and equipment such as farm implements wherein it is desirable to determine not only the velocity of the implement but also the distance or acreage that it has covered. By obtaining a precise velocity measurement, accurate distance and acreage measurements may be derived by conventional techniques.

With respect to farm implements, transceiver systems are particularly useful because they tend to be more accurate than conventional mechanically-driven systems because wheel slippage is not a factor.

In addition, it is desirable in such systems to increase the signal-to-noise ratio and minimize the effects on accuracy resulting from environmental variations such as temperature, humidity or the like. Many such systems do not involve any RF amplification; hence, merely increasing the gain of the antenna or other parts of the system has not yielded a practical improvement in the signal quality. Using a microwave transceiver with a circulator and mixer, which in essence is a superheterodyne system, results in some improvement and with which the present invention may be used to obtain greater improvement. Another desirable feature is to provide a system which does not produce spurious information signals when the actual velocity of the vehicle on which the system is mounted is zero. Such spurious signals may be generated even though the vehicle has stopped because of the system responding to vehicle vibrations, rustling leaves, blowing dirt, or the like. Moreover, it is desirable to provide a means for manually or automatically suspending operation of the system when the vehicle is traversing areas which are not to be included in the measurement, such as roads, bridges or the distance between different areas to be measured or when the implement for which the measurement is being made (e.g. a sprayer) is deactivated.

Reference may be had to one particular such system disclosed in U.S. Pat. No. 3,895,384 which is assigned to the assignee of the present invention. Although the system disclosed therein offers significant advantages over the prior art, the system of the present invention has additional desirable attributes and features that result in improved operational performance and expanded functional capabilities.

OBJECTS AND SUMMARY OF THE INVENTION

It is therefore an object of the present invention to provide a new and improved system for processing an electrical velocity information signal.

It is a further object of the present invention to provide such a system which effectively improves the signal-to-noise ratio of the system.

It is another object of the invention to provide such a system which is essentially unaffected by changes in environmental factors such as temperature and humidity.

It is a specific object of the invention to provide such a system for a microwave velocity detecting system which utilizes the Doppler effect.

It is yet another object of the invention to provide a system which may be manually and/or automatically deactivated without adversely affecting the operation of the system.

In accordance with the invention, there is provided a new and improved system for processing an electrical velocity information signal in a velocity detecting system in which a detector means is utilized for developing the signal having a characteristic that varies systematically in accordance with the velocity of the object subject to detection. The system comprises converter means coupled to the detector means and responsive to the velocity information signal characteristic for developing an oscillatory signal having a frequency which varies in accordance with the velocity information signal characteristic. A tracking filter means having a variable center frequency and responsive to the oscillatory signal for filtering all frequencies other than the center frequency is provided, with the center frequency of the tracking filter means varying in accordance with the frequency of the oscillatory signal. Signal generating means are provided which are responsive to the frequency of the signal passed by the tracking filter for generating an output signal having a frequency which has a preset ratio relative to the center frequency.

In accordance with another aspect of the invention, the signal generating means comprises a voltage-controlled oscillator means, having an input and an output, for generating a signal at the output which has a frequency that varies in accordance with the voltage applied to the input. A comparator means having first and second inputs is utilized, with the first comparator input being coupled to a storage means and the second comparator input being coupled to a reference voltage means, for comparing the voltages at the first and second comparator means inputs and developing a corresponding error voltage. Circuit means are coupled to the storage means for selectively charging and discharging the storage means. Switch means are coupled to the converter means, the voltage-controlled oscillator means, and the circuit means and are responsive to the first and second oscillatory signals for causing the circuit means to alternately charge and discharge the storage means, whereby the output signal of the voltage-controlled oscillator means has a frequency which is a preset ratio of the frequency of the converter output signals as controlled by the circuit means.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
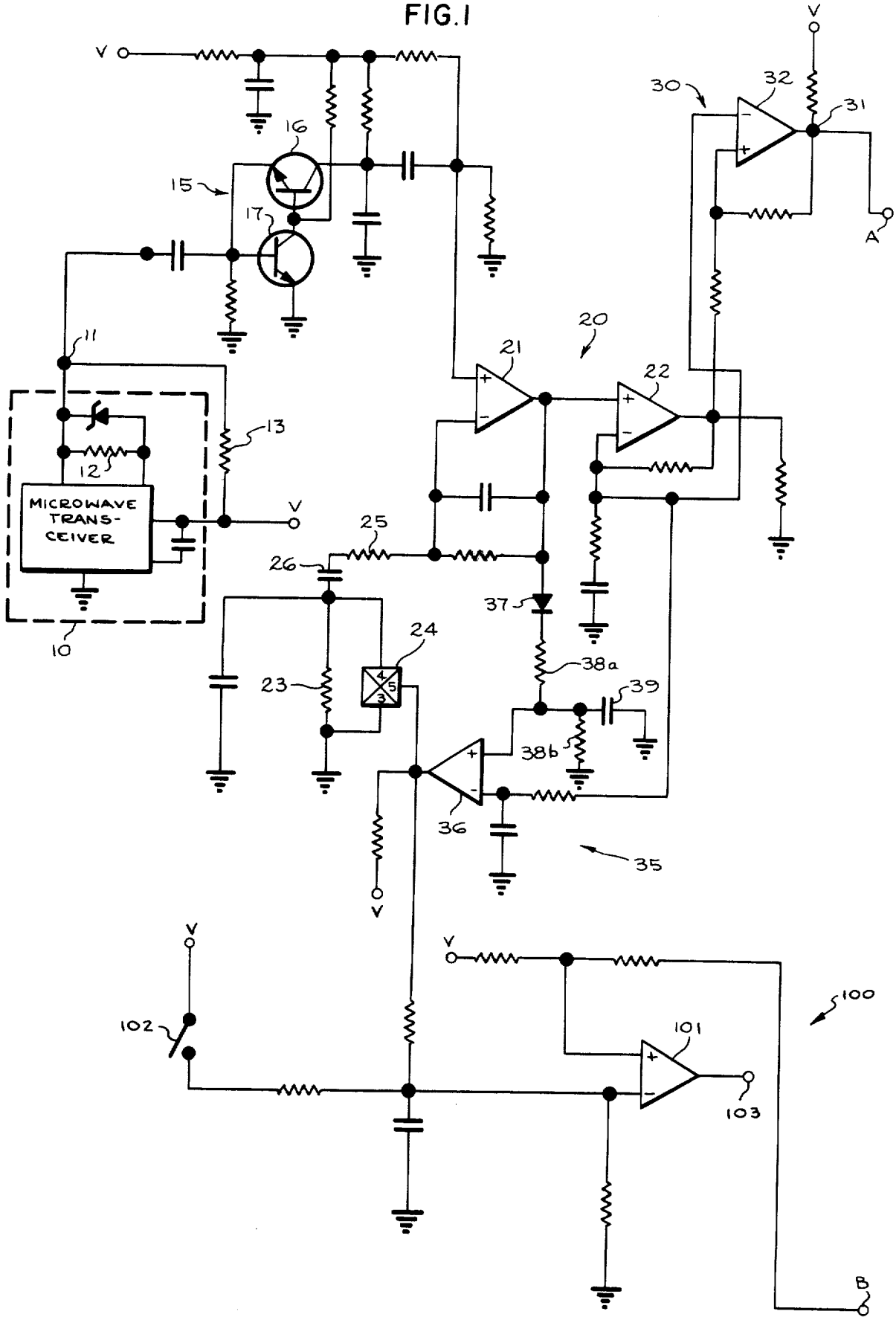
FIG. 1 is an electrical schematic diagram of a portion of the circuitry of a preferred embodiment of a signal processing system constructed in accordance with the present invention and which includes the velocity detector, intermediate frequency amplification stages, level detectors, and converter stage.
Figure 2:
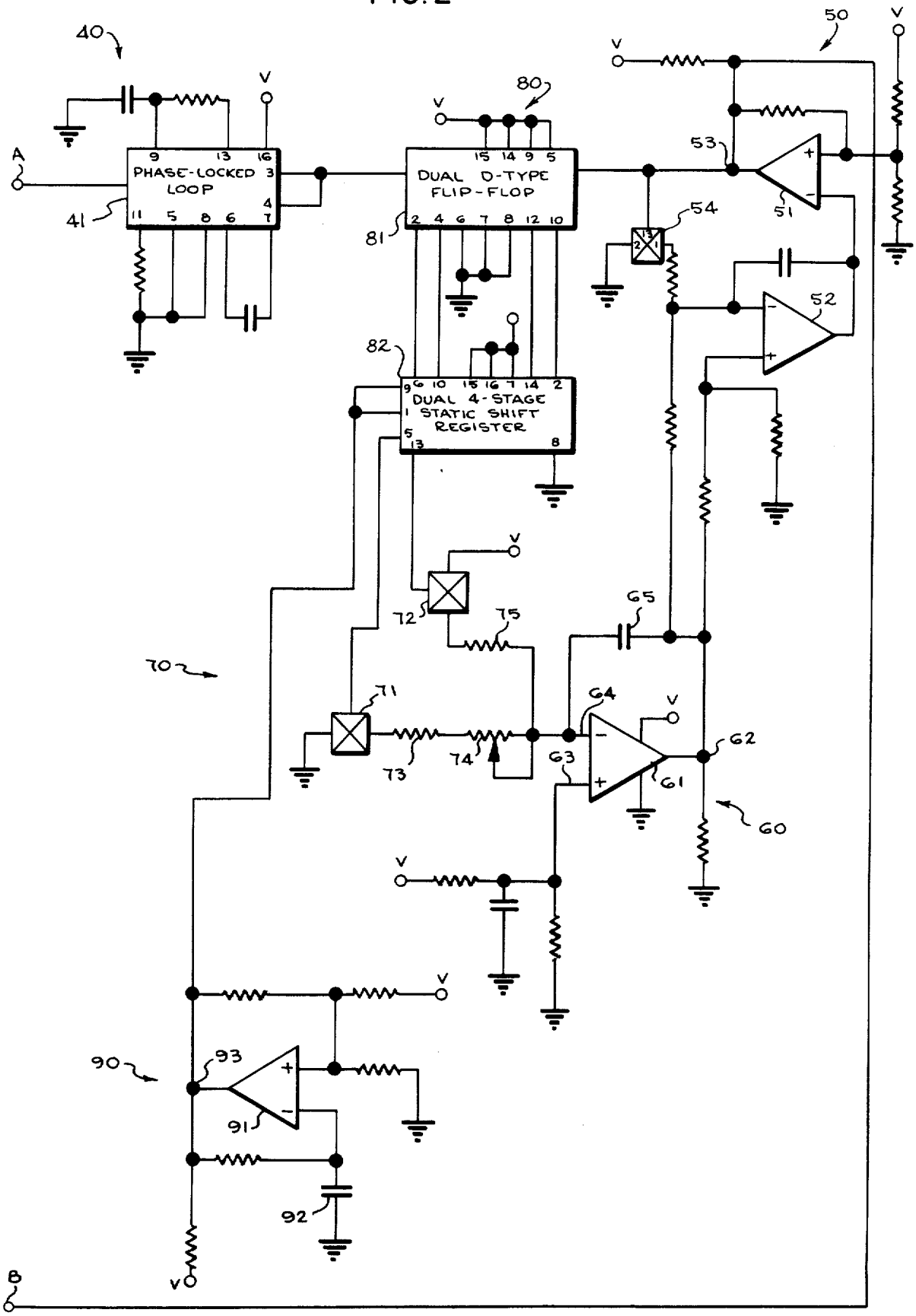
FIG. 2 is an electrical schematic circuit diagram of the remaining portion of a preferred embodiment of the invention, including the tracking filter and signal generating circuitry.

With reference to FIGS. 1 and 2, in general, there is shown an improved system for processing an electrical velocity information signal. It should be noted that the circuits of FIGS. 1 and 2 are connected at points A and B. Detecting means 10 are utilized for developing an electrical information signal which has a characteristic (e.g. frequency) that varies systematically in accordance with (e.g. is directly proportional to, inversely proportional to, or the like) the velocity of an object subject to detection. The system may be mounted on a vehicle, for example, and the object may be the ground over which the vehicle is traversing. By employing a detector 10 which operates on the Doppler phenomenon, a signal such as a microwave signal is radiated from the vehicle to the ground and the reflected signal is received by detector 10 and here is developed an output electrical information signal which has a frequency equal to twice the velocity (in miles per hour) divided by the wavelength of the frequency being used. This assumes that detector 10 is responding to signals reflected from the ground directly ahead of the vehicle. Detector 10 may therefore take the form of a commercially available system which operates on the so-called "X-band" (10.525 GHz) such as a model MA86656-A detector manufactured by Microwave Associates. Further information may be obtained from the book "Radar Handbook" by Merrill Skolnick, published by McGraw-Hill (1970).

The particular type of velocity detector employed does not form an important part of the present invention and is therefore not discussed in any greater detail. It should be noted, however, that the characteristic of the detector's output signal that varies systematically in accordance with the velocity of the objects subject to detection need not necessarily be frequency. In some applications, for example, the output signal could be a DC voltage whose magnitude corresponds to velocity.

In accordance with one feature of the present invention, the detector 10 may be operated in a "starved local oscillator injection" mode and thus achieve a marked increase in noise performance stability. In other words, by applying much less RF injection than that amount suggested by the microwave detector manufacturer, and adding to the mixer diode an amount of DC bias current (via resistors 12 and 13) to bring the mixer back to its typical operating point, the temperature stability of the RF sensitivity of the system is substantially improved.

Converter means 30 are coupled to the output of detector means 10 at output terminal 11 and are responsive to the velocity information signal characteristic (i.e., frequency in the illustrated embodiment of the invention) for developing an oscillatory signal at the output terminal 31 of operational amplifier 32 having a frequency which varies in accordance with the velocity information signal characteristic. In the embodiment of the invention illustrated in FIG. 1, the converter means comprises an operational amplifier 32 biased as shown to effectively operate as a Schmitt Trigger circuit; that is, it is biased in a comparator configuration such that it has relatively close maximum and minimum input switching thresholds, coupled with a fast response time, resulting in its being easily overdriven to thus produce an amplified rectangular pulse signal output signal in response to a relatively wide range (magnitude) of sinusoidal or rectangular wave input signals. It is understood, of course, that in some applications of the invention converter means 30 may take other forms such as a voltage-controlled oscillator to convert a signal having a voltage which is systematically related to velocity into a corresponding rectangular wave output signal without departing from the principles of the invention.

The embodiment of the invention illustrated in FIG. 1, further includes amplifier means coupled between detector 10 and a tracking filter means 40, by way of converter means 30, for amplifying the electrical velocity information signal. Since the output signal of the particular detector 10 employed in the embodiment of the invention illustrated in FIG. 1 is a current signal, the amplifying means includes a low-input-impedance amplifier 15, comprising a pair of amplifying transistors 16 and 17 connected as shown in FIG. 1. The low-input-impedance amplifier is used primarily for converting the current signal into a voltage signal and it provides impedance matching. The operation of amplifier 15 is described in greater detail in the aforementioned U.S. Pat. No. 3,895,384 patent.

Low-input-impedance amplifier 15 is followed by an intermediate frequency (IF) amplifier 20, comprising a pair of operational amplifiers 21 and 22 which are available in integrated circuit form from National Semiconductor and commonly referred to as a "2904". Operational amplifier 21 has a gain which is variable in response to the application of a control signal. Essentially, this is achieved in the illustrated embodiment of the invention by providing an external impedance in the form of a fixed resistor 23 coupled between the inverting input of operational amplifier 21 and ground via resistor 25 and capacitor 26. In parallel with resistor 23 is a switch means in the form of a bilateral switch 24 (available in integrated circuit form from RCA and commonly referred to as a "4066") which is responsive to a switching signal for selectively shorting and unshorting resistor 23. With resistor 23 shorted, the gain of operational amplifier 21 is relatively high; unshorted, relatively low.

The switching signal is derived by a level detecting means in the form of a voltage level detector 35 which includes an operational amplifier 36, a peak detector formed by diode 37 and resistor 38a, and an integrator formed by resistor 38b and capacitor 39. Op amp 36 operates as a comparator to provide a level detecting means to generate the switching signal which actuates switch 24 to thus un-short the normally-shorted resistor 23 and thereby substantially decrease the gain (e.g., by a factor of five) of amplifier 21 when the velocity of the object being detected is essentially zero. The gain is thus decreased to a point where spurious signals, caused by vehicle vibration, rustling leaves, blowing dirt, or the like which might be generated while the vehicle is stopped, are not amplified sufficiently to operate the system. In addition, the output of comparator 36 is applied to the inverting input of another operational amplifier 101 as hereinafter described in greater detail.

Tracking filter means 40 comprise a phase-locked loop 41 operated with a relatively long (e.g. 2 to 3 seconds) time constant which allows it to track the incoming frequency from terminal 31 but delays its response to rapid changes therein. In other words, both the attack (or "capture") and release times of phase locked loop 41 to and from the so-called "locked" state are so slow as to allow the internal oscillator to run at approximately the average frequency of the input signal, but never actually "lock in". Tracking filter 40 thus effectively operates as a high-Q filter which is responsive to the oscillatory signal from converter 30 for filtering all frequencies other than the center frequency (i.e., the frequency of the signal at terminal 31), with this center frequency varying in accordance with the frequency of the oscillatory signal at terminal 31. This results in a substantial improvement in the signal-to-noise ratio because the tracking filter filters out all frequencies except the frequencies of interest, and even though the frequency of interest varies. Phase locked loop 41 may be any suitable circuit such as a "4046" integrated circuit available from RCA.

Signal generating means are responsive to the frequency of the signal passed by the tracking filter for generating an output signal which is a preset ratio relative to the center frequency. In the particular embodiment of the invention illustrated in FIG. 2, the signal generating means comprises a voltage-controlled oscillator means 50, comparator means 60, charging/discharging circuit means 70, switching means 80, and a local oscillator means 90.

Voltage-controlled oscillator means 50 includes a pair of operational amplifiers 51 and 52 and a bilateral switch 54 (e.g. a "4066") connected as shown for generating a signal at the output 53 which has a frequency that varies in accordance with the voltage applied to the inputs of op amp 52.

Comparator means 60 in the form of an op amp 61 biased to operate as a comparator is provided to develop an error voltage at output terminal 62 which is applied to both inputs of operational amplifier 52. Comparator 61 (which may advantageously take the form of an integrated circuit manufactured by RCA and commonly designated "3140") has first and second inputs 63 and 64, with input 63 coupled to a reference voltage source (generally designated throughout the drawings as "V" and which in the illustrated embodiment of the invention is a positive 8 volts) by means of a resistor capacitor network and with its second input 64 coupled to a storage means in the form of a storage capacitor 65.

Circuit means 70 are coupled to the storage capacitor 65 for selectively charging and discharging capacitor 65. The circuit means comprises a pair of bilateral switches 71 and 72 which are coupled to storage capacitor 65 by means of fixed resistor 73 and variable resistor 74, in the case of bilateral switch 71, and by fixed resistor 75, in the case of bilateral switch 72. Switches 71,72 are responsive to the output signals from a dual shift register 82 which is hereinafter described in greater detail. The output signals of dual shift register 82 (which may take the form of an integrated circuit manufactured by RCA and commonly referred to as a "4015") alternately actuate bilateral switches 71 and 72. Bilateral switch 71 is coupled between the inverting input of comparator 61 and ground so that when bilateral switch 71 is closed, capacitor 65 discharges at a rate determined by resistors 73 and 74. On the other hand, when bilateral switch 72 is closed (and thus bilateral switch 71 is open), storage capacitor 65 is charged from reference voltage V at a rate determined by fixed resistor 75. Thus by adjusting the relative value of the total resistance of 73 and 74, compared with that of resistor 75, a desired error voltage at output terminal 62 may be obtained which causes voltage-controlled oscillator means 50 to oscillate at a frequency which has a preset ratio relative to the frequency passed by tracking filter 40. Hence, this signal has a frequency which is a preset ratio relative to the velocity information signal developed by detector 10.

Moreover, with the circuit arrangement shown in the illustrated embodiment of the invention, the output signal at the circuit, which may be taken at output terminal 53 of voltage-controlled oscillator 50, is essentially unaffected by environmental changes because the circuit of the invention effectively factors out such changes. For example, if an environmental change such as temperature were to increase the values of resistors 73 and 74, it would likewise increase the value of resistor 75. Thus, the resulting change in the rate of discharge of storage capacitor 65 would be offset by the resulting change in the rate of charge of storage capacitor 65.

Switch means 80 comprising a dual flip-flop circuit 81 (which may take the form of an integrated circuit manufactured by RCA and commonly referred to as a "4013") and a dual shift register 82 (which was referred to hereinabove) are coupled to the converter means 30 by way of tracking filter 40, coupled to voltage-controlled oscillator 50 at output terminal 53 and coupled to circuit means 70 by way of bilateral switches 71, 72. The switch means 80 is responsive to the oscillatory signals from tracking filter 40 and voltage-controlled oscillator 50 for causing circuit means 70 to alternately charge and discharge storage capacitor 65, as discussed in greater detail above.

In accordance with another feature of the present invention, the preferred embodiment of the invention illustrated in FIG. 2 further comprises a local oscillator means 90 which is coupled to the clock inputs (i.e., terminals 1 and 9) of the dual shift register 82 for providing a clock signal for the switch means 80, whereby each shift register is controlled by the same clock signal to further minimize the influence on the system by environmental changes. In other words, by using a single local oscillator circuit 90 to clock both shift registers of dual shift register 82, changes in the clock frequency caused by temperature, for example, will affect each shift register the same amount. Consequently, since one shift register controls the rate of discharge of capacitor 65 and the other controls the rate of charge of capacitor 65, changes in the local oscillator frequency are effectively cancelled. By employing dual shift registers and a clock as shown, greater resolution of information is obtainable; that is, an increased number of pulses of information may be utilized for control purposes.

Local oscillator circuit 90 comprises an operational amplifier 91 having a timing capacitor 92 and associated biasing resistors connected as shown to provide a local oscillator signal at output terminal 93. In the illustrated embodiment of the invention, the oscillator frequency of local oscillator circuit 90 is approximately 13 KHz, although it may range from 12 to 14 KHz so long as the drift is relatively slow, without adversely affecting the accuracy of the system. Thus another advantage of the present invention is that it enables a relatively low cost oscillator circuit to be employed; that is, an oscillator circuit which need not be held to close tolerances with respect to its frequency of oscillation by means of a relatively expensive crystal or the like.

In accordance with another feature of the present invention, means in the form of gating circuit 100 are coupled to amplifying means 20 by way of bilateral switch 24 and operational amplifier 21 for externally applying a control signal, whereby the output signal may be blocked either manually or in response to the occurrence of a predetermined external event. Gating circuit 100 comprises an operational amplifier 101 utilized as a comparator and a switch 102 which may take the form of a manual switch on the vehicle control panel (not shown) or the form of a mechanical or electronic switch which is automatically actuated whenever the vehicular implement for which the system is being used (e.g. a sprayer, seed planter, harvester, etc.) is deactivated. In the embodiment illustrated, switch 102 applies a positive voltage V to the inverting input terminal of op amp 101 to thereby inhibit the passage of the output signal at output terminal 53 of voltage-controlled oscillator 50 to the output terminal 103 of gating circuit 100. The output signal at terminal 103 may of course be used to operate a counting circuit to obtain calibrated velocity information, which in turn may be used to derive accurate distance and/or acreage information.

Thus there has been shown and described a new and improved system for processing an electrical velocity information signal. The system of the invention effectively improves the signal-to-noise ratio and provides an output signal which is essentially unaffected by changes in environmental factors such as temperature and humidity. The system of the invention finds particular utility in connection with a microwave transceiver velocity detecting system which takes advantage of the well-known Doppler effect. Another feature of the invention provides for manual and/or automatic deactivation of the system without interfering with its operation. In other words, the system may be temporarily deactivated while a liquid sprayer or planter, for example, is temporarily deactivated without introducing errors because of the deactivation and subsequent reactivation.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design and others being apparent only after study. As such, the scope of the invention should not be limited by the particular embodiment and specific construction described herein which should be defined by the appended claims, and equivalents thereof. Accordingly, the aim of the appended claims is to cover all such changes and modifications as fall within the true spirit and scope of the invention.

The invention is claimed as follows:

1. In a velocity detecting system in which detector means are utilized for developing an electrical information signal having a characteristic that varies systematically in accordance with the velocity of an object subject to detection, an improved system for processing said electrical velocity information signal, comprising: converter means coupled to said detector means and responsive to said velocity information signal characteristic for developing an oscillatory signal having a value which varies in accordance with said velocity information signal characteristic; filter means, including a phase-locked loop circuit operated with a relatively long time constant to prevent said phase-locked loop circuit from locking, having a variable center value and responsive to said oscillatory signal for filtering all values other than said center value, said center value varying in accordance with said value of said oscillatory signal; and signal generating means responsive to the value of the signal passed by said filter means for generating an output signal having a value which is a preset ratio relative to said center value, whereby the output signal of the system is relatively noise free and has a value which represents the [predetermined] velocity for the object being detected.

2. A system in accordance with claim 1, which further comprises [amplifier] *amplifying* means coupled between said velocity detecting means and said filter means for amplifying said electrical velocity information signal, said amplifying means having a gain which is variable in response to the application of a control signal; and level detecting means responsive to said electrical velocity information signal characteristic attaining a value corresponding to a predetermined minimum velocity for generating a control signal, whereby the gain of the [amplifier] *amplifying means* is automatically reduced to a substantially lower level when the velocity of the object being detected is essentially zero.

3. A system in accordance with claim 2, which further includes gating means coupled to said signal generating means for selectively gating said output signal; and means for actuating said gating means, whereby said output signal may be selectively passed or blocked manually or in response to the occurrence of a predetermined external event.

4. A system in accordance with claim 2, in which said amplifying means comprises an operational amplifier having an external impedance coupled to the inverting input of said operational amplifier; and further comprises a switch coupled in parallel with said impedance and responsive to said switching signal for shorting said impedance, whereby the gain of said amplifier is switched from a relatively low value when the switch is open to a relatively high value when the switch is closed.

5. A system in accordance with claim 1, in which said converter means includes an operational amplifier biased as a Schmitt trigger circuit, whereby a relatively wide range of input velocity information signals are converted into rectangular pulse wave oscillatory signals.

6. In a velocity detecting system in which detector means are utilized for developing an electrical information signal having a characteristic that varies systematically in accordance with the velocity of an object subject to detection, an improved system for processing said electrical velocity information signal, comprising: converter means coupled to said detector means and responsive to said velocity information signal characteristic for developing a first oscillatory signal having a frequency which varies in accordance with said velocity information signal characteristic; voltage-controlled oscillator means, having an input and an output, for generating a signal at said output which has a frequency that varies in accordance with the voltage applied to said input, storage means; reference voltage means; comparator means having first and second inputs, with said first comparator input coupled to said storage means and said second comparator input coupled to said reference voltage means, for comparing the voltages at said first and second comparator means inputs and developing a corresponding error voltage; means for applying said error voltage to said voltage-controlled oscillator means input; circuit means coupled to said storage means for selectively charging and discharging said storage means; switch means coupled to said converter means, said voltage-controlled means and to said circuit means and responsive to said first and second oscillatory signals for causing said circuit means to alternately charge and discharge said storage means, whereby the output signal of the voltage-controlled oscillator means has a frequency which is a preset ratio of the frequency of the converter output signal as controlled by the circuit means and which is essentially unaffected by environmental changes.

7. A system in accordance with claim 6, in which said switching means comprises a pair of flip-flops respectively coupled to said converter means and to said voltage-controlled oscillator means, and further comprises a corresponding pair of shift registers respectively coupled to said pair of flip-flops, for producing a pair of control signals which cause said circuit means to alternately charge and discharge said storage means.

8. A system in accordance with claim 6, in which said circuit means comprises a pair of bilateral switches and said comparator means comprises an operational amplifier, with one of said bilateral switches being coupled between said reference voltage means and the inverting input of said operational amplifier by a first resistance, and with the other said bilateral switch being coupled between ground and the non-inverting input of said operational amplifier by a second resistance, whereby the storage means is charged at a rate controlled by one of said bilateral switches and discharged at a rate controlled by the other of said bilateral switches.

9. A system in accordance with claim 8, in which one of said resistances includes a variable resistance, whereby the charging rate of said storage means may be adjusted to a predetermined ratio of the discharging rate of said storage means.

10. A system in accordance with claim 7, which further comprises local oscillator means coupled to the clock inputs of said pair of shift registers for providing a clock signal for said switch means, whereby each shift register is controlled by the same clock signal to further minimize the influence on the system by environmental changes.

11. In a velocity detecting system in which detector means are utilized for developing an electrical information signal having a characteristic that varies systematically in accordance with the velocity of an object subject to detection, an improved system for processing said electrical velocity information signal, comprising: means coupled to said detector means for operating said detector in a starved local oscillator injection mode; filter means, including a phase-locked loop circuit operated with a relatively long time constant to prevent said phase-locked loop circuit from locking, having a variable center characteristic and responsive to said information signal for filtering all characteristics other than said center characteristic, said center characteristic varying in accordance with said characteristic of said information signal; and signal generating means responsive to the characteristic of the signal passed by said filter means for generating an output signal having a value which is a preset ratio relative to said center characteristic, whereby the temperature stability and noise performance stability of the system are substantially improved.

12. A system in accordance with claim [1] *11*, which further comprises [amplifier] *amplifying* means coupled between said velocity detecting means and said filter means for amplifying said electrical velocity information signal, said amplifying means having a gain which is variable in response to the application of a control signal; and level detecting means responsive to said electrical velocity information signal characteristic attaining a value corresponding to a predetermined minimum velocity for generating a control signal, whereby the gain of the [amplifier] *amplifying means* is automatically reduced to a substantially lower level when the velocity of the object being detected is essentially zero.

13. A system in accordance with claim [2] *12*, which further includes gating means coupled to said signal generating means for selectively gating said output signal; and means for actuating said gating means, whereby said output signal may be selectively passed or blocked manually or in response to the occurrence of a predetermined external event.

14. A system in accordance with claim [2] *12*, in which said amplifying means comprises an operational amplifier having an external impedance coupled to the inverting input of said operational amplifier; and further comprises a switch coupled in parallel with said impedance and responsive to said switching signal for shorting said impedance, whereby the gain of said amplifier is switched from a relatively low value when the switch is open to a relatively high value when the switch is closed.

15. A system in accordance with claim [1] *11* which further comprises converter means coupled to said detector means and responsive to said velocity information signal characteristic for developing an oscillatory signal having a value that varies in accordance with said velocity information signal characteristic, said converter means including an operational amplifier biased as a Schmitt trigger circuit, whereby a relatively wide range of input velocity information signals are converted into rectangular pulse wave oscillatory signals.

16. In a velocity detecting system in which detector means are utilized for developing an electrical information signal having a characteristic that varies systematically in accordance with the velocity of an object subject to detection, an improved system for processing said electrical velocity information signal, comprising: signal generating means responsive to said electrical velocity information signal for generating an output signal having a value indicative of said velocity; amplifier means coupled between said velocity detecting means and said signal generating means for amplifying said electrical velocity information signal, said amplifying means having a gain which is variable in response to the application of a control signal; and level detecting means responsive to said electrical velocity information signal characteristic attaining a value corresponding to a predetermined minimum velocity for generating a control signal, whereby the gain of the amplifier is automatically reduced to a substantially lower level when the velocity of the object being detected is near zero.

17. A system in accordance with claim 16, which further includes gating means coupled to said signal generating means for selectively gating said output signal; and means for actuating said gating means, whereby said output signal may be selectively passed or blocked manually or in response to the occurrence of a predetermined external event.

18. A system in accordance with claim 16, in which said amplifying means comprises an operational amplifier having an external impedance coupled to the inverting input of said operational amplifier; and further comprises a switch coupled in parallel with said impedance and responsive to said switching signal for shorting said impedance, whereby the gain of said amplifier is switched from a relatively low value when the switch is open to a relatively high value when the switch is closed.

19. In a velocity detecting system in which detector means are utilized for developing an electrical information signal having a characteristic that varies systematically in accordance with the velocity of an object subject to detection, an improved system for processing said electrical velocity information signal, comprising: voltage-controlled oscillator means, having an input and an output, for generating an oscillatory signal at said output which has a frequency that varies in accordance with the voltage applied to said input, storage means; reference voltage means; comparator means having first and second inputs, with said first comparator input coupled to said storage means and said second comparator input coupled to said reference voltage means, for comparing the voltages at said first and second comparator means inputs and developing a corresponding error voltage; means for applying said error voltage to said voltage-controlled oscillator means input; circuit means coupled to said storage means for selectively charging and discharging said storage means; switch means coupled to the output of said detector means, said voltage-controlled means and to said circuit means and responsive to said electrical velocity information signal and said oscillatory signal for causing said circuit means to alternately charge and discharge said storage means, whereby the output signal of the voltage-controlled oscillator means has a value that corresponds to said velocity and which is essentially unaffected by environmental changes.

20. A system in accordance with claim 19, in which said switching means comprises a pair of flip-flops respectively coupled to said detector means and to said voltage-controlled oscillator means, and further comprises a corresponding pair of shift registers respectively coupled to said pair of flip-flops, for producing a pair of control signals which cause said circuit means to alternately charge and discharge said storage means.

21. A system in accordance with claim 19, in which said circuit means comprises a pair of bilateral switches and said comparator means comprises an operational amplifier, with one of said bilateral switches being coupled between said reference voltage means and the inverting input of said operational amplifier by a first resistance, and with the other said bilateral switch being coupled between ground and the non-inverting input of said operational amplifier by a second resistance, whereby the storage means is charged at a rate controlled by one of said bilateral switches and discharged at a rate controlled by the other of said bilateral switches.

22. A system in accordance with claim 21, in which one of said resistances includes a variable resistance, whereby the charting rate of said storage means may be adjusted to a predetermined ratio of the discharging rate of said storage means.

23. A system in accordance with claim 20, which further comprises local oscillator means coupled to the clock inputs of said pair of shift registers for providing a clock signal for said switch means, whereby each shift register is controlled by the same clock signal to further minimize the influence on the system by environmental changes.

*24. In a velocity detecting system in which detector means are utilized for developing an electrical information signal having a characteristic that varies systematically in accordance with the velocity of an object subject to detection, an improved system for processing said electrical velocity information signal, comprising: converter means coupled to said detector means and responsive to said velocity information signal characteristic for developing an oscillatory signal having a value which varies in accordance with said velocity information signal characteristic; filter means, including a phase-locked loop circuit operated with a relatively long time constant to prevent said phase-locked loop circuit from locking, having a variable center value and responsive to said oscillatory signal for filtering all values other than said center value, said center value varying in accordance with said value of said oscillatory signal; whereby a filtered signal comprising the signal passed by said filter means is relatively noise free and has a value which represents the velocity for the object being detected.*

*25. A system in accordance with claim 24, which further comprises amplifying means coupled between said velocity detecting means and said filter means for amplifying said electrical velocity information signal, said amplifying means having a gain which is variable in response to the application of a control signal; and level detecting means responsive to said electrical velocity information signal characteristic attaining a value corresponding to a predetermined minimum velocity for generating a control signal, whereby the gain of the amplifier is automatically reduced to a substantially lower level when the velocity of the object being detected is essentially zero.*

*26. A system in accordance with claim 24, which further includes gating means coupled to said filter means for selectively gating said filtered signal, whereby said filtered signal may be selectively passed or blocked manually or in response to the occurrence of a predetermined external event.*

*27. A system in accordance with claim 25, in which said amplifying means comprises an operational amplifier having an external impedance coupled to the inverting input of said operational amplifier; and further comprises a switch coupled in parallel with said impedance and responsive to said switching signal for shorting said impedance, whereby the gain of said amplifier is switched from a relatively low value when the switch is open to a relatively high value when the switch is closed.*

*28. A system in accordance with claim 24, in which said converter means includes an operational amplifier biased as a Schmitt trigger circuit, whereby a relatively wide range of input velocity information signals are converted into rectangular pulse wave oscillatory signals.*

* * * * *